(12) United States Patent
Paulus et al.

(10) Patent No.: US 10,394,885 B1
(45) Date of Patent: Aug. 27, 2019

(54) METHODS, SYSTEMS AND COMPUTER PROGRAM PRODUCTS FOR GENERATING PERSONALIZED FINANCIAL PODCASTS

(71) Applicant: INTUIT INC., Mountain View, CA (US)

(72) Inventors: Wolfgang Paulus, Ramona, CA (US); Cynthia Joann Osmon, Sunnyvale, CA (US); Diane L. Weiss, Cupertino, CA (US); Jacob N. Huffman, Oakland, CA (US)

(73) Assignee: INTUIT INC., Mountain View, CA (US)

( * ) Notice: Subject to any disclaimer, the term of this patent is extended or adjusted under 35 U.S.C. 154(b) by 319 days.

(21) Appl. No.: 15/070,953

(22) Filed: Mar. 15, 2016

(51) Int. Cl.
| | |
|---|---|
| *G06F 7/00* | (2006.01) |
| *G06F 17/30* | (2006.01) |
| *G06F 16/68* | (2019.01) |
| *G10L 13/027* | (2013.01) |
| *G10L 13/04* | (2013.01) |

(52) U.S. Cl.
CPC ............ *G06F 16/68* (2019.01); *G10L 13/027* (2013.01); *G10L 13/043* (2013.01)

(58) Field of Classification Search
CPC ......... G06F 17/30873; G06F 17/30864; G06F 16/68; G06Q 40/00; G10L 13/027; G10L 13/043

USPC .......................... 707/748, 749, 999.005, 722
See application file for complete search history.

(56) References Cited

U.S. PATENT DOCUMENTS

| | | | | |
|---|---|---|---|---|
| 6,334,104 | B1* | 12/2001 | Hirai ..................... | G10L 13/047 704/258 |
| 2005/0125322 | A1* | 6/2005 | Lacomb ................. | G06Q 40/00 705/35 |
| 2013/0159826 | A1* | 6/2013 | Mason .............. | G06F 17/30873 715/205 |
| 2014/0222636 | A1* | 8/2014 | Cheng .................... | G06Q 50/01 705/35 |

* cited by examiner

*Primary Examiner* — Md I Uddin
(74) *Attorney, Agent, or Firm* — DLA Piper LLP US

(57) ABSTRACT

A personalized financial podcast generation system, the system includes a user data module configured to acquire user data associated with a user and analyze the user data to identify a keyword associated with a financial topic of interest to the user. The system also includes a keyword analyzer configured to calculate a weight of the keyword. The system further includes a content analyzer configured to identify financial media content based on the keyword and the weight. Moreover, the system includes a summarizer configured to identify a relevant sentence in the financial media content. In addition, the system includes a speech processor configured to synthesize speech based on the relevant sentence.

36 Claims, 15 Drawing Sheets

METHODS, SYSTEMS AND COMPUTER PROGRAM PRODUCTS FOR GENERATING PERSONALIZED FINANCIAL PODCASTS

SUMMARY

Embodiments are directed to systems, computer-implemented methods, and computer program products for generating personalized financial podcasts.

In one embodiment directed to a personalized financial podcast generation system, the system includes a user data module configured to acquire user data associated with a user and analyze the user data to identify a keyword associated with a financial topic of interest to the user. The system also includes a keyword analyzer configured to calculate a weight of the keyword. The system further includes a content analyzer configured to identify financial media content based on the keyword and the weight. Moreover, the system includes a summarizer configured to identify a relevant sentence in the financial media content. In addition, the system includes a speech processor configured to synthesize speech based on the relevant sentence.

In another embodiment directed to a computer-implemented method for generating a personalized financial podcast, the method includes acquiring user data associated with a user. The method also includes analyzing the user data to identify a keyword associated with a financial topic of interest to the user. The method further includes calculating a weight of the keyword. Moreover, the method includes identifying financial media content based on the keyword and the weight. In addition, the method includes identifying a relevant sentence in the financial media content. The method also includes synthesizing speech based on the relevant sentence.

In still another embodiment directed to a computer program product including a non-transitory computer readable storage medium embodying one or more instructions executable by a computer system having a server computer and a tax return preparation computer to perform a process for generating a personalized financial podcast, the process includes acquiring user data associated with a user, analyzing the user data to identify a keyword associated with a financial topic of interest to the user, calculating a weight of the keyword, identifying financial media content based on the keyword and the weight, identifying a relevant sentence in the financial media content, and synthesizing speech based on the relevant sentence.

In one or more embodiments, analyzing the user data includes analyzing user profile data. Analyzing the user data may include analyzing an event associated with the user. Analyzing the user data may include analyzing user financial data. Analyzing the user data may include analyzing user financial management system data.

In one or more embodiments, the weight of the keyword is based on an allocation of user resources to an investment associated with the keyword. The weight of the keyword may be based on a fluctuation of allocation of user resources to the investment associated with the keyword over time. The weight of the keyword may be based on a weight of the keyword associated with another user having a profile similar to a profile of the user. Calculating the weight of the keyword may include analyzing a weighted word cloud.

In one or more embodiments, identifying financial media content includes filtering, sorting and prioritizing the financial media content. The financial media content may include a body of text including the relevant sentence. Identifying relevant sentence in the financial media content may include analyzing an overall duration of the final podcast. Identifying the relevant sentence in the financial media content may include analyzing the weight of the keyword. Identifying the relevant sentence in the financial media content may include outputting a text paragraph.

In one or more embodiments, synthesizing speech based on the relevant sentence includes emphasizing a portion of the relevant sentence. The portion of the relevant sentence may be a word or a sentence fragment. Synthesizing speech based on the relevant sentence may include appending an audio signal to the relevant sentence.

In one or more embodiments, the content analyzer is configured to avoid identifying redundant financial media content. The method may also include avoiding identifying redundant financial media content.

In one or more embodiments, the user is an individual. In other embodiments, the user is a business.

In one or more embodiments, the summarizer is also configured to assemble a podcast including the synthesized speech. The method may also include assembling a podcast including the synthesized speech.

BRIEF DESCRIPTION OF THE DRAWINGS

The foregoing and other aspects of embodiments are described in further detail with reference to the accompanying drawings, in which the same elements in different figures are referred to by common reference numerals, wherein.

Figure 1:
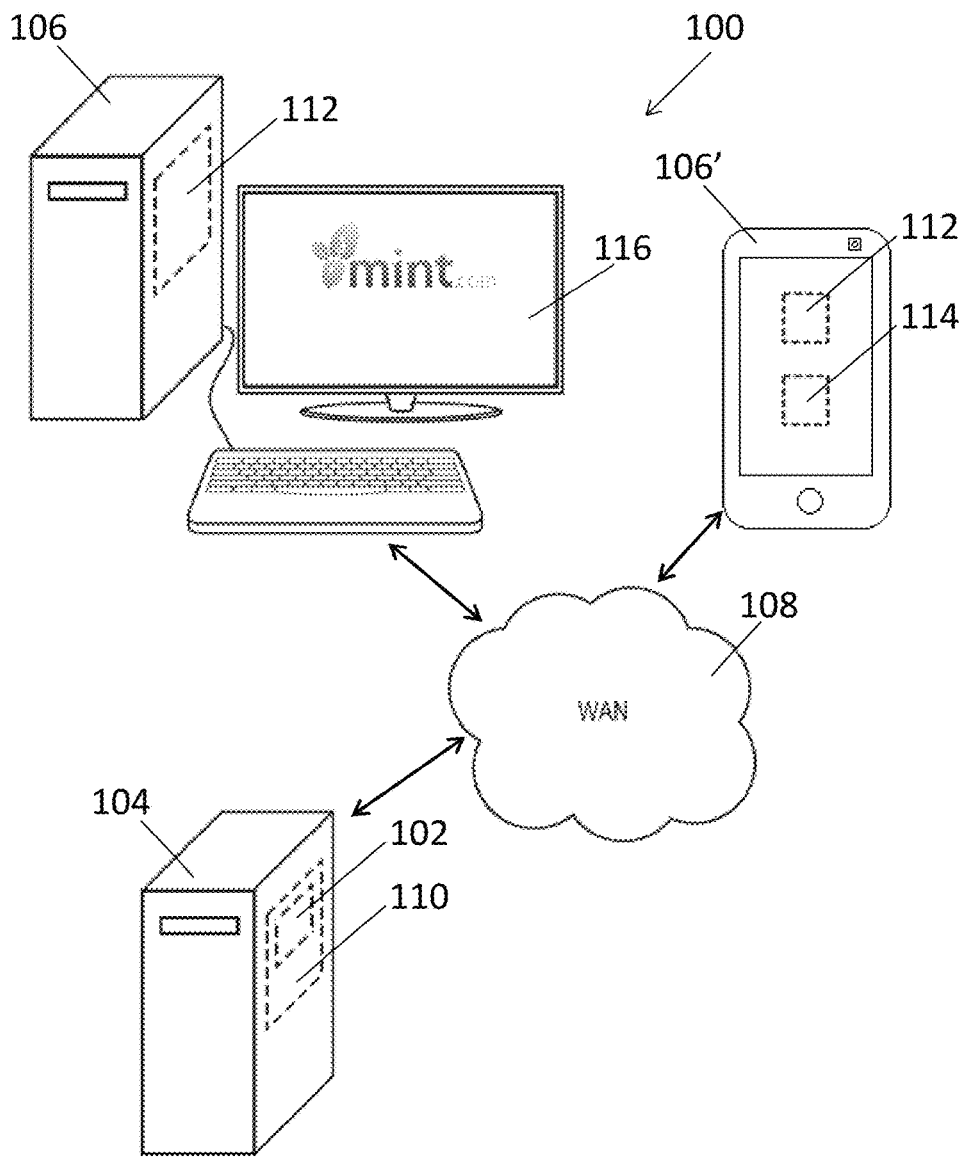
FIGS. 1 to 6 are schematic diagrams illustrating the implementation of personalized financial podcast generation systems on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Embodiments describe methods, systems and articles of manufacture for generating personalized financial podcasts. In particular, the embodiments describe analyzing user data to identify keywords associated with financial topics of interest to the user, and using those keywords to generate a personalized financial podcast from financial media content. The user may be any entity, including, but not limited to, an individual or a business.

News aggregators, like GOOGLE NEWS, present news of interest to a user on a webpage accessible to the user. Such aggregators typically require user input to identify topics of interest to the user, such as a particular stock or financial sector. Further, if a user's interest changes, the aggregator will not reflect this change until the user makes the effort to update their interests in the program. Similarly, if the underlying conditions that triggered the user's interest change, the aggregator will not reflect this change until the aggregator is updated. This setup and maintenance requires valuable, and not always available, user time and resources, resulting in decreased accuracy in identifying news of interest to a user.

Speech synthesizers generate speech from text using various algorithms with varying results. While some speech synthesizers may generate speech similar in quality to natural human speech, they do not transform the content of the speech/text to improve comprehension for listeners/users. Speech is an audio format that lacks some of the characteristics of written text that improve reading comprehension, such as the ability to quickly (almost unconsciously) review previously read sections.

Podcasts are an increasingly popular form of media for delivering news of interest to users. Due to their audio format, users can consume podcasts when their eyes are otherwise occupied, such as when they are commuting to work. In busy modern life, podcasts are a technical solution to the problem of too many demands on limited time. However, podcasts are not tailored to a user's interests and may include content outside of the user's interests. Such extraneous content can reduce the ability of podcasts to save a user's time.

The embodiments described herein generate financial podcasts personalized to a user by analyzing user data. In one embodiment, the user data is analyzed to identify keywords associated with financial topics of interest to the user and to calculate the relevance or "weights" for the keywords. The weighted keywords are used to identify financial media content (i.e., news articles) of interest to the user. The identified financial media content is summarized to fit within user-supplied constraints of the podcast. The summarized identified financial media content is assembled into the text of a personalized financial podcast. The text summary is synthesized/transformed into speech, and comprehension increasing features are added to the speech. The analyzing, identifying, summarizing, synthesizing and assembling can be performed by a personalized financial podcast program automatically without user intervention.

Identifying and weighing keywords based on user data facilitates personalization of the financial podcast such that the podcast only summarizes financial media content associated with topics of interest to the user. Personalization of financial podcasts maximizes delivery of information of interest to the user in a minimum amount of time. Further, adding comprehension increasing features to the synthesized speech improves comprehension even with an audio format. Moreover, automatic podcast generation reduces setup requirements and substantially eliminates maintenance requirements for the system.

The embodiments described herein address the computer-specific problems of: (1) generating a podcast while minimizing information that is not of interest to the user; and (2) modifying synthesized audio content to maximize user/listener comprehension. The embodiments described herein also transform text information to modified audio content personalized for a user and modified to maximize user comprehension.

As used in this application, a "podcast" includes, but is not limited to, audio digital media configured to be downloaded to and played on a computer or a mobile computing or communication device. Podcasts can be interactive. For instance, some podcasts have chapter markers for quick navigation between chapters, allowing chapters can to be skipped. Artwork, hyperlinks and other meta data can also be included with podcasts (e.g., with some or all of the chapters). As used in this application, "user data" includes, but is not limited to, information that may indicate a user's interest in a financial topic. As used in this application, "synthesized speech" includes, but is not limited to, artificially produced human speech.

As used in this application, "financial management program" or "financial management system" includes, but is not limited to, software that oversees and governs an entity's income, expenses, and assets. An exemplary financial management system is MINT Financial Management Software, which is available from Intuit Inc. of Mountain View, Calif. A financial management system is executed to assist a user with managing its finances, and is used solely for financial management. Financial management systems manage financial transaction data from financial transaction generators such as accounts including checking, savings, money market, credit card, stock, loan, mortgage, payroll or other types of account. Such financial transaction generators can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKEN Financial Management Software, QUICKRECIPTS Financial Management Software, FINANCEWORKS Financial Management Software, Microsoft Money Financial Management Software and YODLEE Financial Management Software (available from Yodlee, Inc. of Redwood City, Calif.).

As used in this application, "computer," "computer device," or "computing device" includes, but are not limited to, a computer (stationary/desktop or portable/laptop) and a computer or computing device of a handheld mobile communication device, smartphone and tablet computing device such as an IPHONE or an IPAD (available from Apple Inc. of Cupertino, Calif.). As used in this application, "server" or "server computer" includes, but is not limited to, one or more separate and independent software and/or hardware components of a computer that must be added to a general purpose computer before the computer can receive and respond to requests from other computers and software in order to share data or hardware and software resources among the other computers and software, and computers having such components added thereto. As used in this application, "user data computer" and "user data program" include, but are not limited to, one or more separate and independent software and/or hardware components of a computer that must be added to a general purpose computer before the computer can receive, generate, store and transmit user data to other computers and software, and computers having such components added thereto.

As used in this application, "website" includes, but is not limited to, one or more operatively coupled webpages. As used in this application, "browser," "web browser," "browser program," "web browser program," "browser application" or "web browser application" includes, but is not limited to, one or more separate and independent software and/or hardware components of a computer that must be added to a general purpose computer before the computer can receive, display and transmit resources from/to the World Wide Web. As used in this application, "podcast player program" or "podcast player application" includes, but is not limited to, one or more separate and independent software and/or hardware components of a computer that must be added to a general purpose computer before the computer can transform audio digital media into electronic signals that may be rendered as sound using appropriate hardware.

As used in this application, "input/output module" includes, but is not limited to, one or more separate and independent software and/or hardware components of a computer that must be added to a general purpose computer before the computer can communicate with and facilitate the receipt and transfer of information, including user data and synthesized speech, from and to other computers. As used in this application, "memory module" includes, but is not limited to, one or more separate and independent software and/or hardware components of a computer that must be added to a general purpose computer before the computer can store information, including user data and synthesized speech.

As used in this application, "user data module" includes, but is not limited to, one or more separate and independent software and/or hardware components of a computer that must be added to a general purpose computer before the computer can acquire and analyze user data to identify a financial topic of interest to the user and a keyword associated therewith. As used in this application, "keyword analyzer" includes, but is not limited to, one or more separate and independent software and/or hardware components of a computer that must be added to a general purpose computer before the computer can calculate a weight for a keyword, where the weight is indicative of the user's level of interest in a financial topic associated with the keyword. As used in this application, "content analyzer" includes, but is not limited to, one or more separate and independent software and/or hardware components of a computer that must be added to a general purpose computer before the computer can identify financial media content of interest to the user based on a keyword and its associated weight. As used in this application, "summarizer" includes, but is not limited to, one or more separate and independent software and/or hardware components of a computer that must be added to a general purpose computer before the computer can identify a relevant sentence in financial media content. As used in this application, "speech processor" includes, but is not limited to, one or more separate and independent software and/or hardware components of a computer that must be added to a general purpose computer before the computer can synthesize speech.

FIG. 1 depicts an exemplary hardware system 100 on which a personalized financial podcast generation system/program 102 according to one embodiment can be executed. The hardware system 100 according to this embodiment includes a server computing device 104 and first and second user computing devices 106, 106', which are operatively coupled via a network 108. The first user computing device 106 is a stationary or desktop computer. The second user computing device 106' is a handheld computer/mobile communication device, i.e., a smartphone. The network 108 may be two or more networks depending on the system configuration and communication protocols employed. One or more or all of networks 108 may be, for example, a wireless or cellular network, a private communication network (e.g., mobile phone network), a Local Area Network (LAN) and/or a Wide Area Network (WAN). Reference to network 108 generally is not intended to refer to a specific network or communications protocol, and embodiments can be implemented using various networks 108 and combinations thereof.

In the embodiment depicted in FIG. 1, the personalized financial podcast generation system 102 is part of or a module in a financial management system/program 110 ("FMS") running on the server computing device 104. An exemplary FMS is MINT Financial Management Software, which is available from Intuit Inc. of Mountain View, Calif. Separate instance of web browser programs 112 are running on the first and second user computing devices 106, 106'. A podcast player program 114 is also running on the second user computing device 106'. The web browser program 112 and/or podcast player program 114 running on the second user computing device 106' may be applications or "apps". The various computing devices 104, 106, 106' may include visual displays or screens 116 operatively coupled thereto. In the embodiment depicted in FIG. 1, the first and second user computing devices 106, 106' include respective displays or screens 116 through which a user physically interfaces with the first and second user computing devices 106, 106' and the web browser programs 112 running thereon.

While the personalized financial podcast generation system 102 in FIG. 1 is depicted as running on the server computing device 104 and accessed through the web browser program 112 running on the first and second user computing devices 106, 106', in other embodiments, a personalized financial podcast generation system may run directly on a user computing device. In such embodiments, no web browser program is needed to access the personalized financial podcast generation system. In embodiments where the user computing device is a mobile communication device, such as a smartphone, the personalized financial podcast generation system may be an application.

Figure 2:
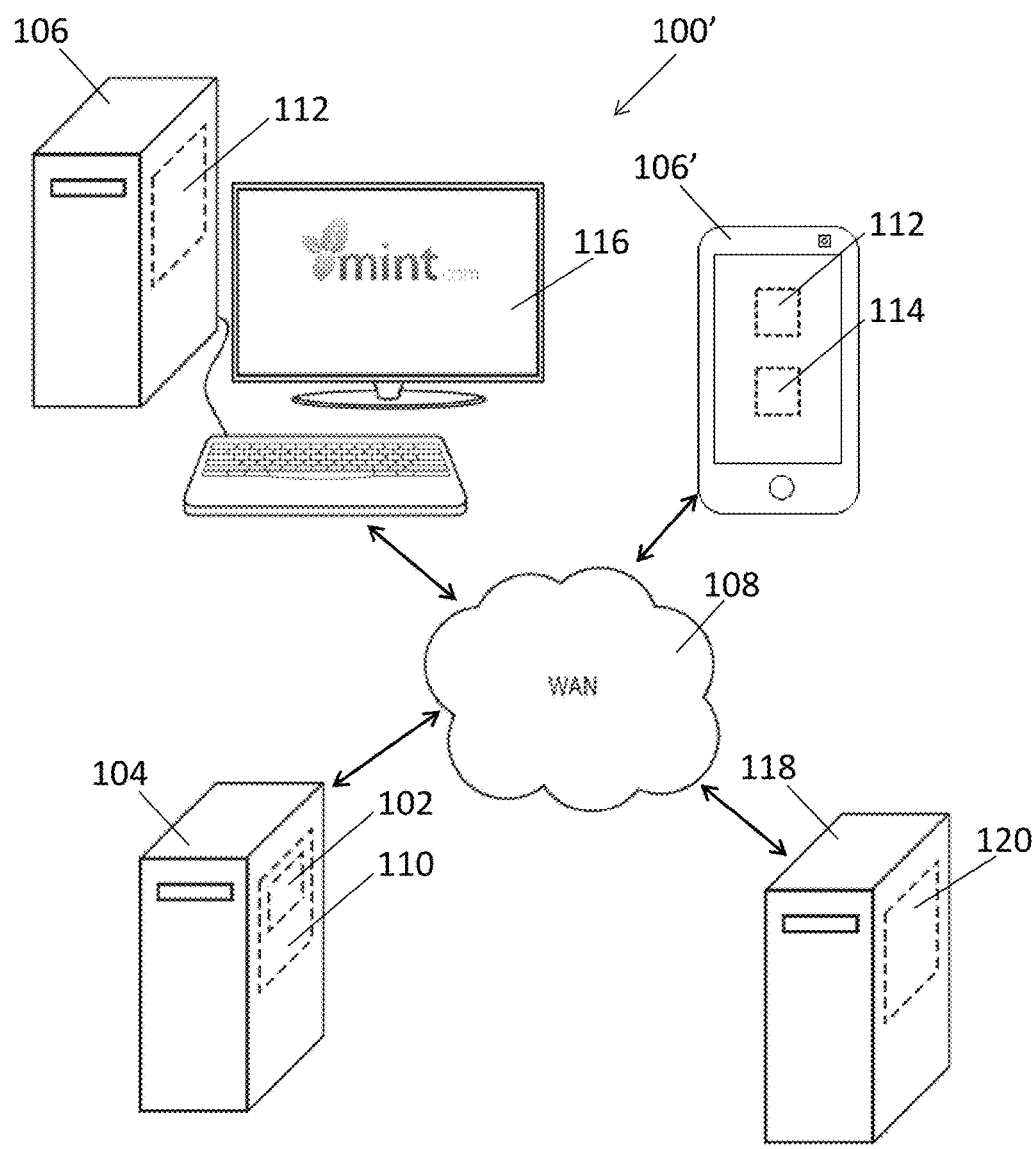

FIG. 2 depicts another exemplary hardware system 100' on which a personalized financial podcast generation system 102 according to another embodiment can be executed. The hardware system 100' depicted in FIG. 2 is similar to the hardware system 100 depicted in FIG. 1. However, in addition to the server computing device 104 and the first and second user computing devices 106, 106', the hardware system 100' also includes a user data computing device 118 operatively coupled to the server computing device 104 and first and second user computing devices 106, 106' via the network 108. The user data computing device 118 hosts a user data program 120, from which the server computing device 104 and the user computing device 106 may obtain taxpayer data.

User data programs 120 provide the personalized financial podcast generation system 102 access to user data that may indicate a user's interest in a financial topic. Exemplary user data programs 118 include tax return preparation programs, online social media websites with which the taxpayer has accounts, third parties databases or resources (such as government databases or documents, such as property tax records, Department of Motor Vehicle (DMV) records), and other external sources of user data. Examples of tax return preparation programs that may include user information include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif.

Figure 3:
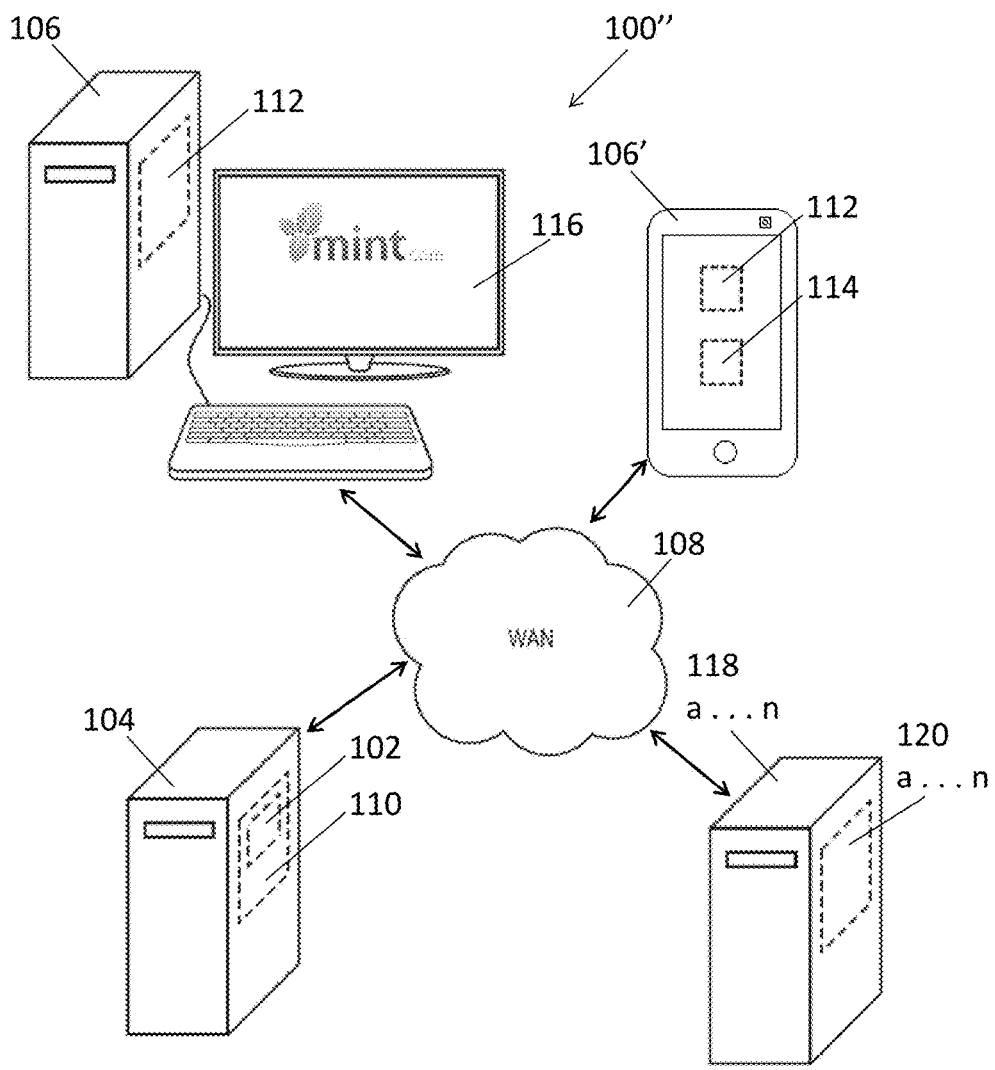

FIG. 3 depicts still another exemplary hardware system 100" on which a personalized financial podcast generation system 102 according to still another embodiment can be executed. The hardware system 100" depicted in FIG. 3 is similar to the hardware system 100' depicted in FIG. 2. However, instead of the single user data computing device 118 in the hardware system 100' depicted in FIG. 2, the hardware system 100" includes a plurality of user data computing devices 118a . . . 118n operatively coupled to the server computing device 104 and the first and second user computing devices 106, 106' via the network 108. The plurality of other user computing device 118a . . . 118n hosts a respective plurality of user data programs 120a . . . 120n (e.g., different types of user data programs), from which the server computing device 104 may obtain user data, as described above with respect to FIG. 2.

While FIGS. 2 and 3 depict the server computing device 104, the first and second user computing devices 106, 106' and the user data computing devices 118 as being operatively coupled by the same network 108, in other embodiments, these computing devices may be operatively coupled by two or more networks. While FIGS. 2 and 3 depicts the financial management system 110 (including the personalized financial podcast generation system 102) and the user data program 120 as running on separate computing devices 104, 118, in other embodiments, the financial management system 110 (including the personalized financial podcast generation system 102) and the user data program 120 may run on the same computing device (e.g., the server computing device 104).

The user data programs 120 and user data computers 118 described above are not intended to be the only sources of user data that may indicate a user's interest in a financial topic. For instance, the personalized financial podcast generation system 102 may utilize keywords and financial topics of interest previously identified for other users who are similar to the user to identify keywords and financial topics of interest for the current user. In particular, the personalized financial podcast generation system 102 may generate a word cloud based on similarities (e.g., in the profiles) of previous users to the current user and the keywords and weights identified for those previous users. Profiles may be considered similar they have a certain percentage (e.g., 50%, 60%, 70%, 80%, 90%, etc.) of identical values. Such an analysis would utilize anonymized user data to generate the word cloud.

Figure 4:
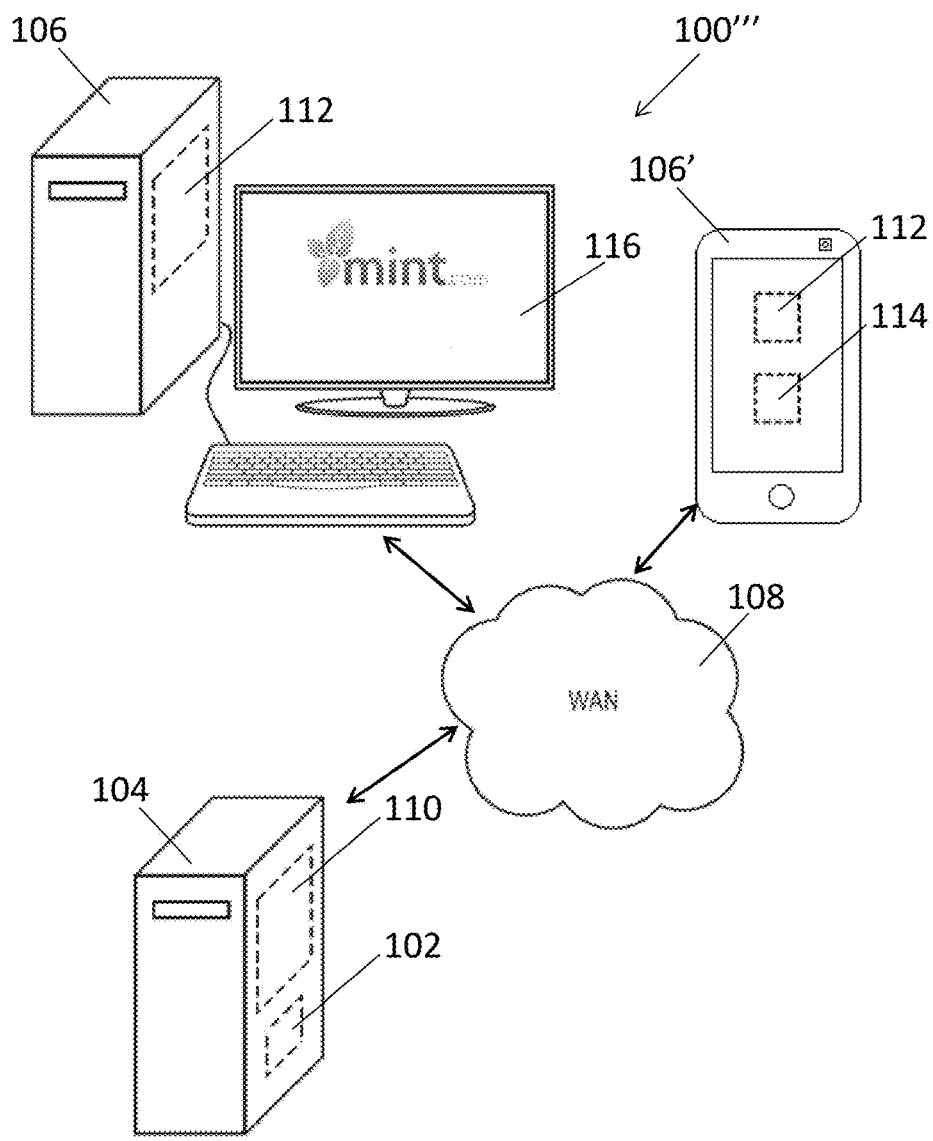

FIG. 4 depicts yet another exemplary hardware system 100''' on which a personalized financial podcast generation system 102 according to another embodiment can be executed. The hardware system 100''' depicted in FIG. 4 is similar to the hardware system 100 depicted in FIG. 1. However, the personalized financial podcast generation system 102 depicted in FIG. 4 is not part of the financial management system 110. Instead, the personalized financial podcast generation system 102 is a separate program that runs on the same server computing device 104 as the financial management system 110.

Figure 5:
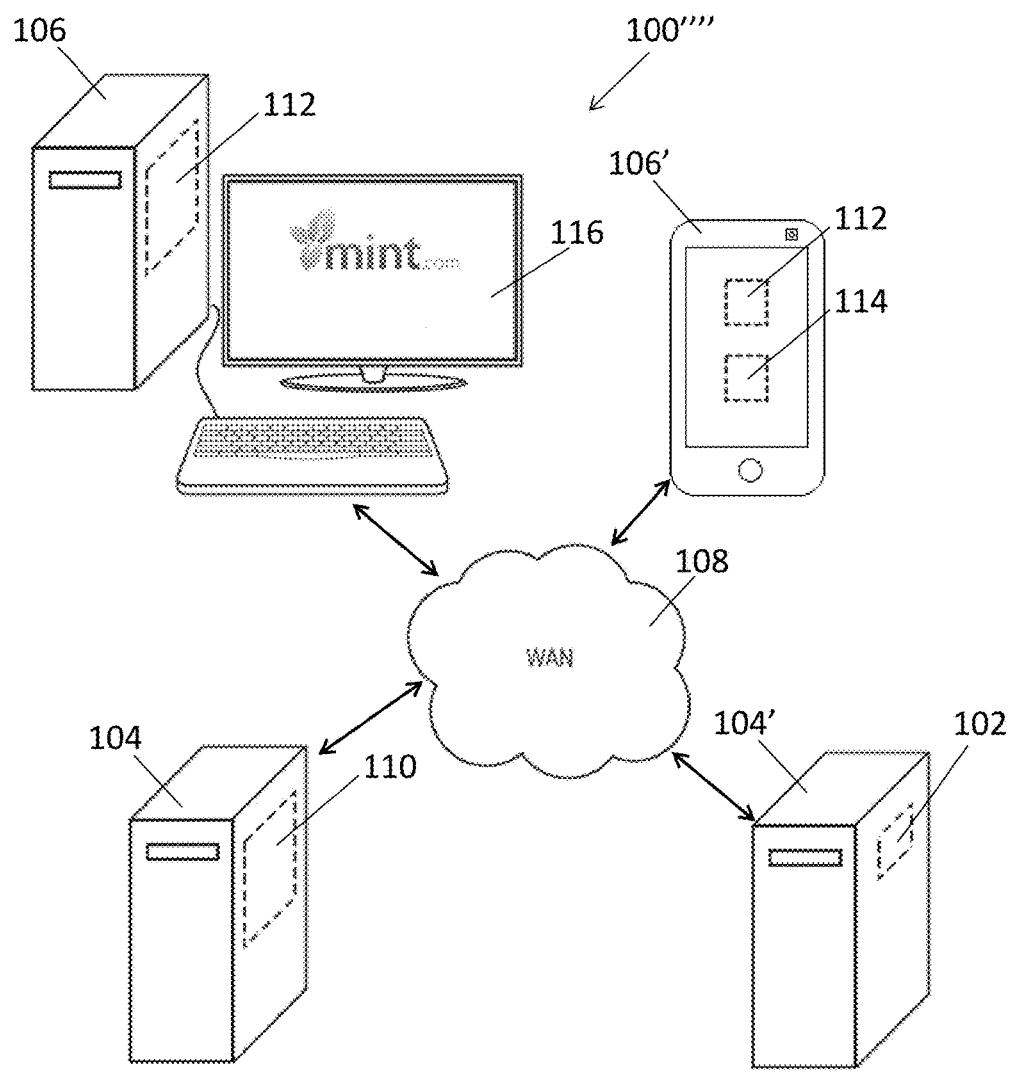

FIG. 5 depicts another exemplary hardware system 100'''' on which a personalized financial podcast generation system 102 according to another embodiment can be executed. The hardware system 100'''' depicted in FIG. 5 is similar to the hardware system 100''' depicted in FIG. 4. However, the personalized financial podcast generation system 102 depicted in FIG. 5 does not run on the server computing device 104 on which the financial management system 110 runs. Instead, the personalized financial podcast generation system 102 depicted in FIG. 5 runs on a second server computing device 104' operatively coupled to the server computing device 104 and the first and second user computing devices 106, 106' via the network 108.

Figure 6:
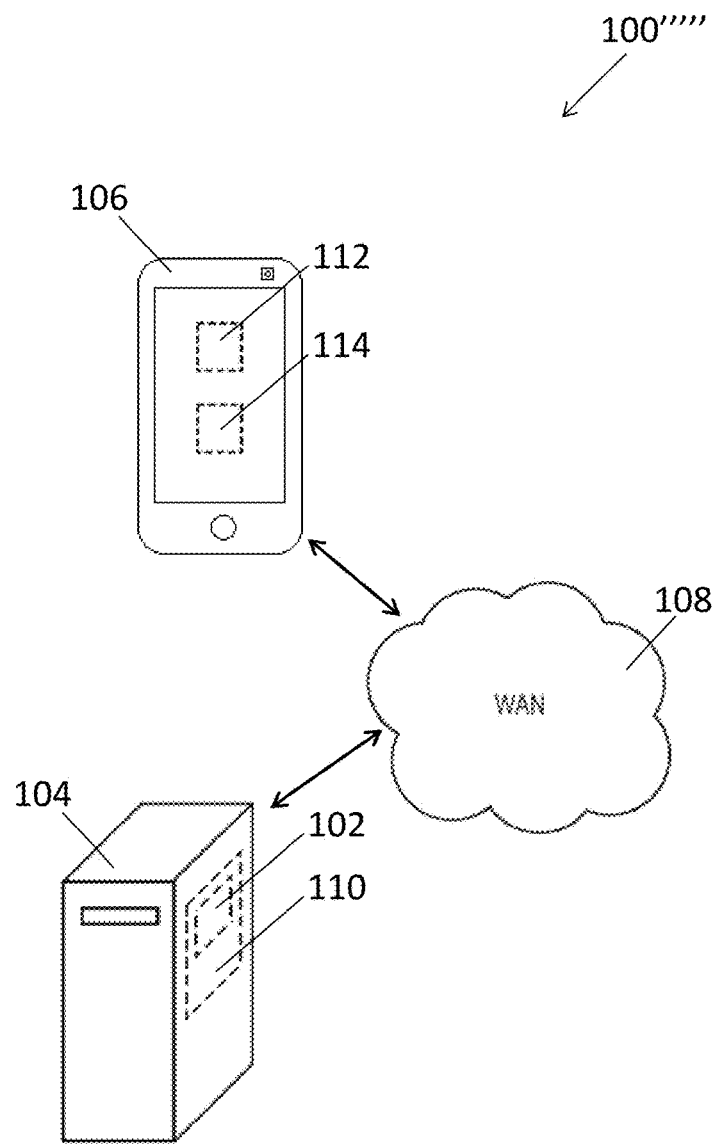

FIG. 6 depicts still another exemplary hardware system 100''''' on which a personalized financial podcast generation system 102 according to another embodiment can be executed. The hardware system 100''''' depicted in FIG. 6 is similar to the hardware system 100 depicted in FIG. 1. However, there is no second user computing device in the hardware system 100''''' depicted in FIG. 6. Instead, the hardware system 100''''' includes only a single user computing device 106, which is a handheld computer/mobile communication device, i.e., a smartphone. Both the web browser program (i.e., application) 112 and the podcast player program (i.e., application) 114 run on the user computing device 106.

Figure 7:
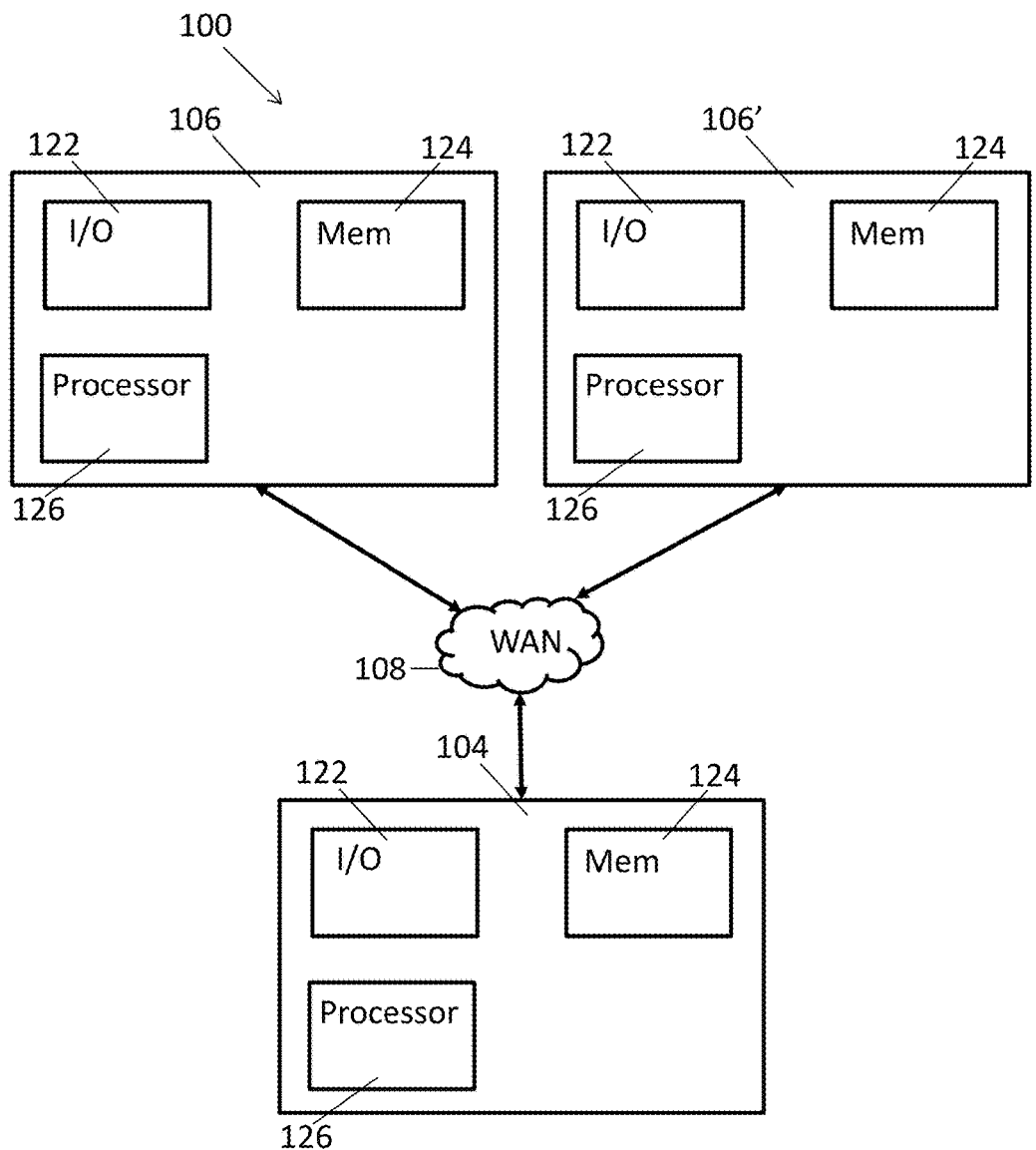
FIGS. 7 to 10 are block diagrams of computer systems according to various embodiments on which personalized financial podcast generation systems according to various embodiments may be implemented.

FIG. 7 depicts, in greater detail, a hardware system 100 configured to host a personalized financial podcast generation system 102 according to one embodiment. Like the hardware system 100 depicted in FIG. 1, the hardware system 100 in FIG. 7 includes a server computing device 104 and first and second user computing devices 106, 106' that are operatively coupled by a network 108. The server computing device 104 includes an input/output module 122, a memory module 124 and a processor 126. Each of the first and second user computing devices 106, 106' also includes an input/output module 122, a memory module 124 and a processor 126. The input/output modules 122 are configured to communicate with and facilitate the receipt and transfer of data, including user data and synthesized speech. The memory modules 124 are configured to store data, including user data and synthesized speech, in proper formats for, e.g., analysis of the user data and generation of personalized financial podcasts from the synthesized speech. The processors 126 in the server computing device 104 and the user computing device 106 are configured to respectively run programs/applications (e.g., personalized financial podcast generation system 102, financial management system 110 and web browser program 112), as shown in FIGS. 8-10.

Figure 8:
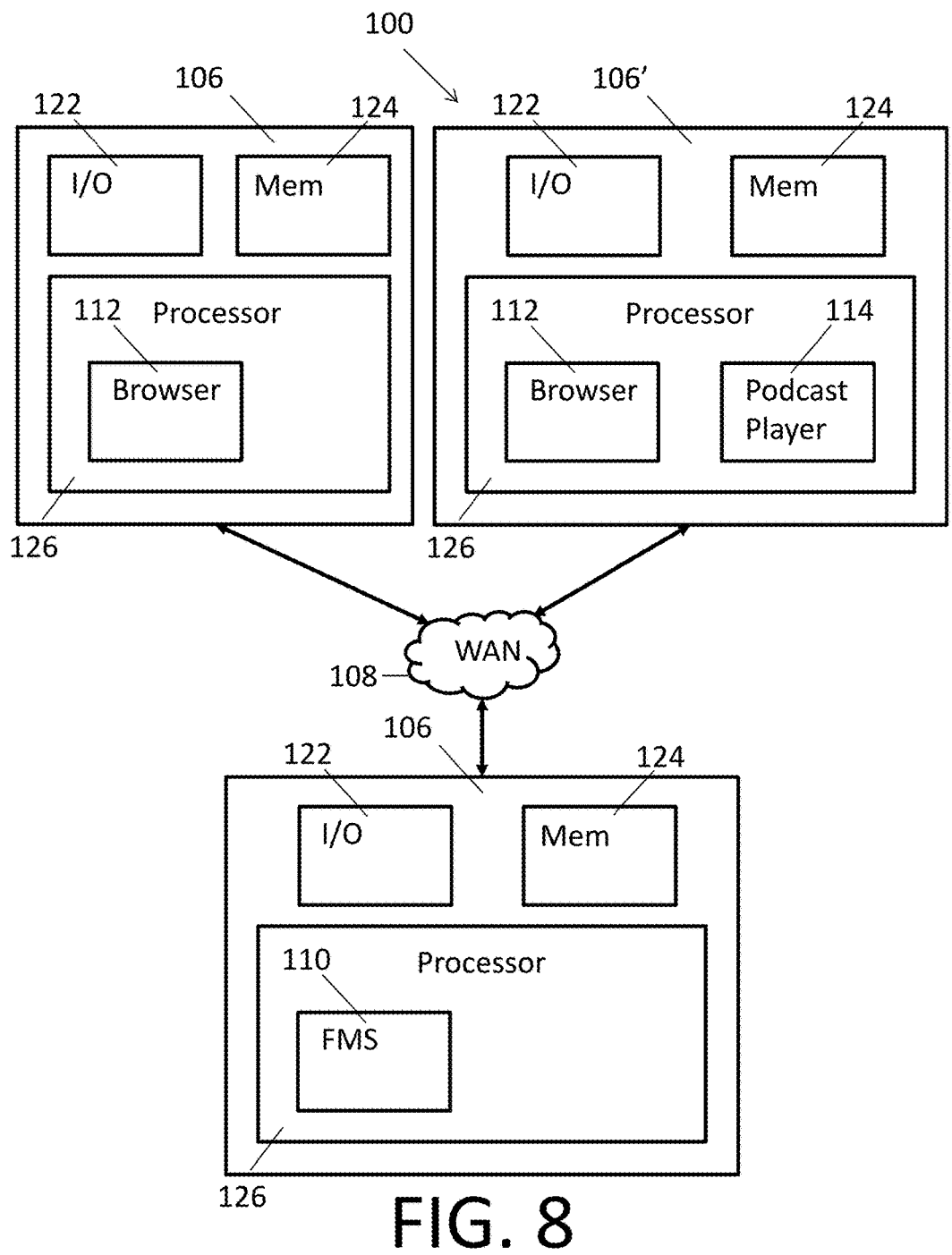

FIG. 8 depicts, in even greater detail, another hardware system 100 configured to host a personalized financial podcast generation system 102 according to one embodiment. Like the hardware system 100 depicted in FIG. 1, the hardware system 100 in FIG. 8 includes a server computing device 104 and first and second user computing devices 106, 106' that are operatively coupled by a network 108. The server computing device 104 includes an input/output module 122, a memory module 124 and a processor 126. Each of the first and second user computing devices 106, 106' also includes an input/output module 122, a memory module 124 and a processor 126. The input/output modules 122 are configured to communicate with and facilitate the receipt and transfer of data, including user data and synthesized speech. The memory modules 124 are configured to store data, including user data and synthesized speech, in proper formats for, e.g., analysis of the user data and generation of personalized financial podcasts from the synthesized speech.

The processor 126 in the server computing device 104 is configured to run a financial management system/program 110. The FMS 110 oversees and governs an entity's (e.g., a user's) income, expenses, and assets. As such, the FMS 110 has access to user data (e.g., a user's ownership of a particular security) that can indicate a user's interest in a financial topic. The processor 126 in the first user computing device 106 is configured to run a web browser program 112. The processor 126 in the second user computing device 106' is configured to run a web browser program/application 112 and a podcast player program/application 114. The web browser program/application 112 is configured to access the FMS 110 running on the server computing device 104 through the network 108. The podcast player program/application 114 is configured to transform audio digital media into electronic signals that may be rendered as sound using appropriate hardware.

Figure 9:
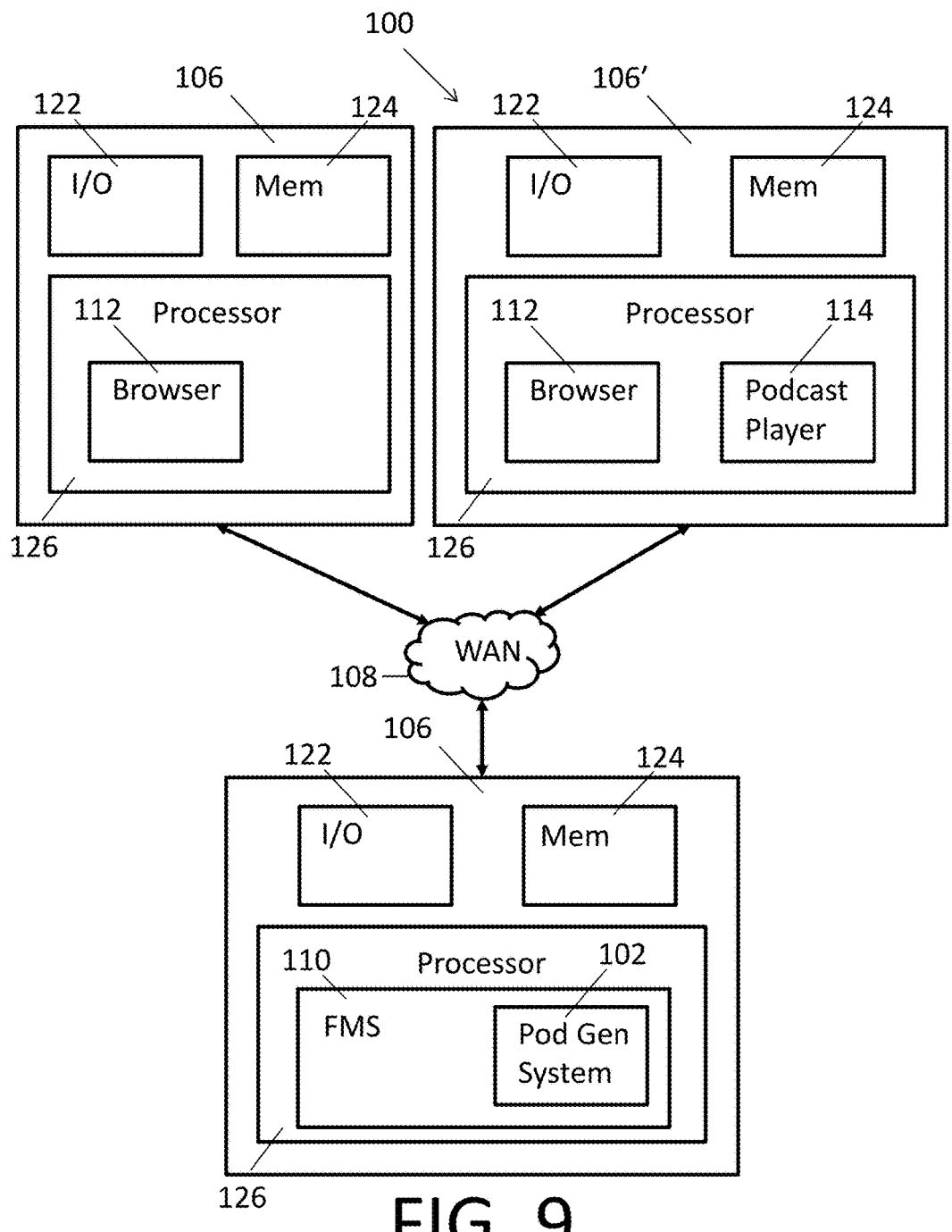
Figure 10:
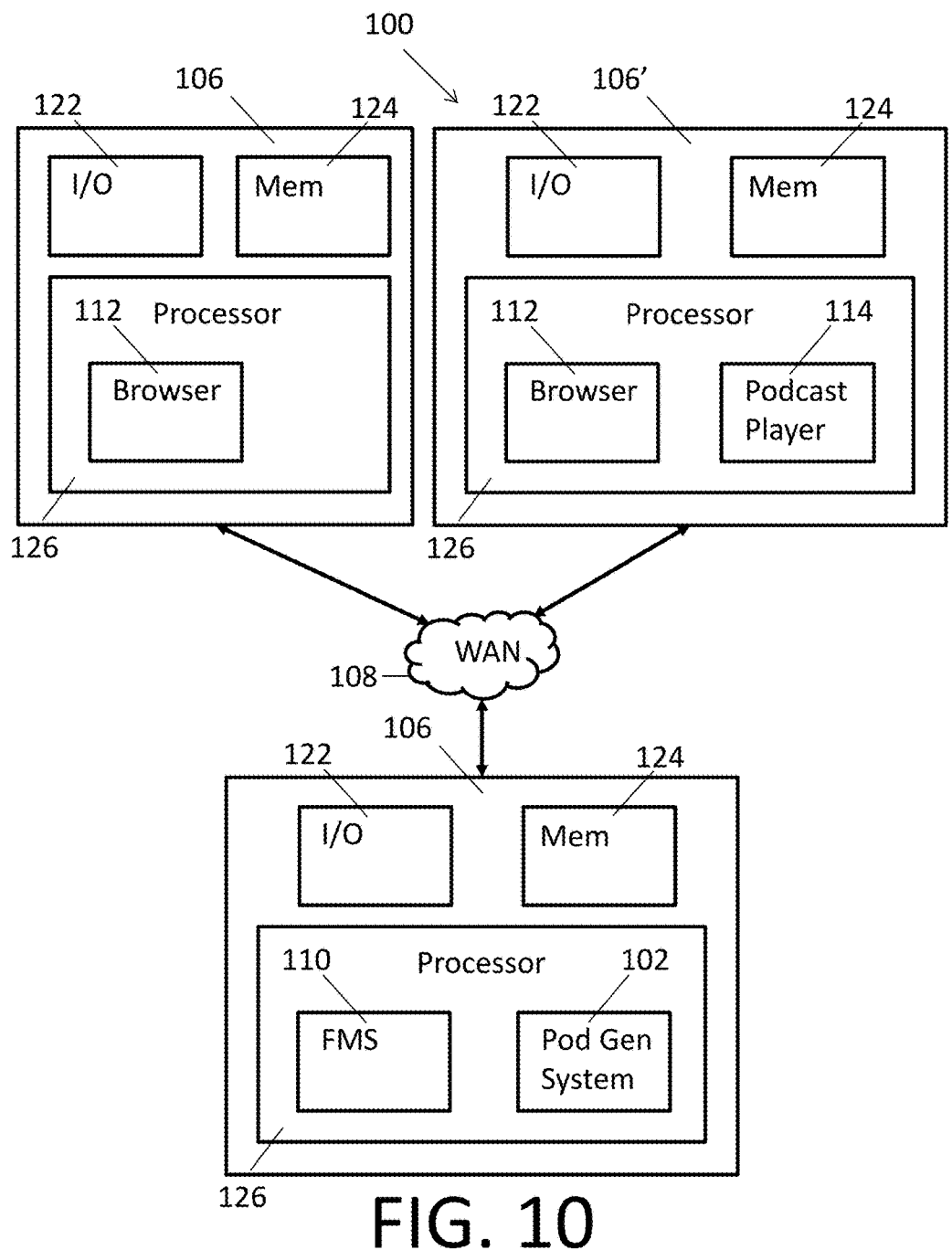

FIG. 9 depicts, in still greater detail, still another hardware system 100 configured to host a personalized financial podcast generation system 102 according to one embodiment. The hardware system 100 depicted in FIG. 9 is almost identical to the hardware system 100 depicted in FIG. 8. The greater detail of FIG. 9 illustrates that the financial management system/program 110 depicted in FIG. 9 includes a personalized financial podcast generation system 102, which may be a module in the financial management system/program 110. The personalized financial podcast generation system 102 is configured to analyze user data and financial media content to generate personalized financial podcasts. While the personalized financial podcast generation system 102 in FIG. 9 is depicted as a module in the financial management system/program 110, the personalized financial podcast generation system 102 may be a separate program running on the server computing device 104 as shown in FIG. 10. The other components depicted in FIG. 10 are identical to those depicted in FIG. 9.

Figure 11:
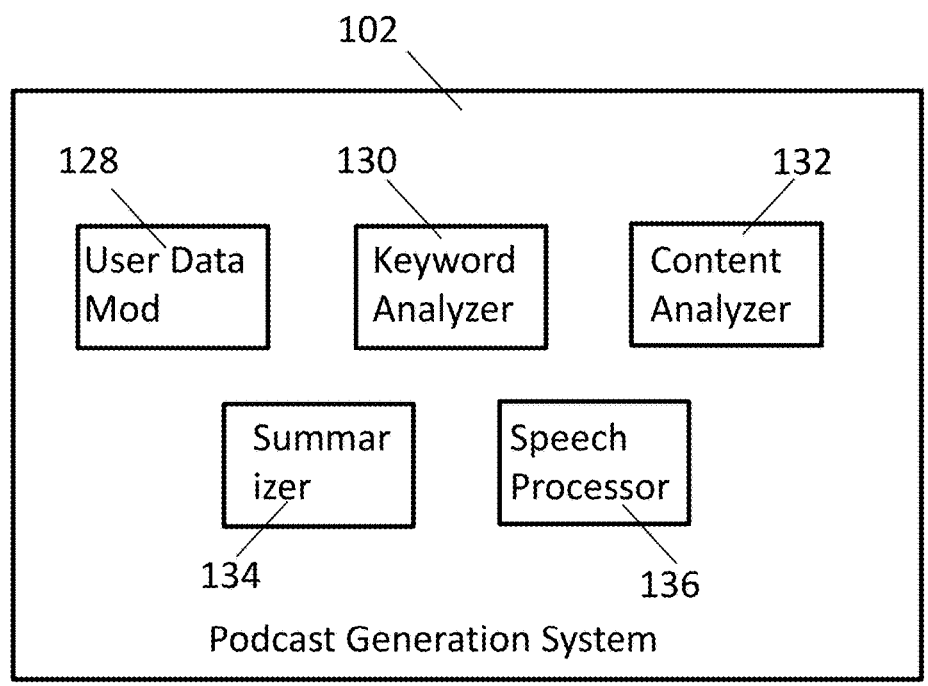
FIG. 11 is a block diagram of a personalized financial podcast generation system according to one embodiment.

FIG. 11 depicts, in greater detail, a personalized financial podcast generation system 102 according to one embodiment. The personalized financial podcast generation system 102 includes a user data module 128, a keyword analyzer 130, a content analyzer 132, a summarizer 134 and a speech processor 136. All of these components/modules may be operatively/logically connected elements of the personalized financial podcast generation system 102.

The user data module 128 is configured to acquire and analyze user data to identify a financial topic of interest to the user and a keyword associated therewith. The keyword analyzer 130 is configured to calculate a weight for a keyword, where the weight is indicative of the user's level of interest in a financial topic associated with the keyword. In some embodiments, the weight may also be indicative of the relevance of the keyword to the financial topic of interest to the user. The content analyzer 132 is configured to identify financial media content of interest to the user based on a keyword and its associated weight. The content analyzer 132 may obtain financial media content from publically available news aggregators, such as GOOGLE NEWS. The summarizer 134 is configured to identify a relevant sentence in financial media content. The summarizer may apply known semantic techniques to identify topic or conclusion sentences or paragraphs. The speech processor 136 is configured to synthesize speech from text sources. In some embodiments, the speech processor 136 may add comprehension increasing features to the synthesized speech, and/or generate a personalized financial podcast from the synthesized speech.

Figure 12:
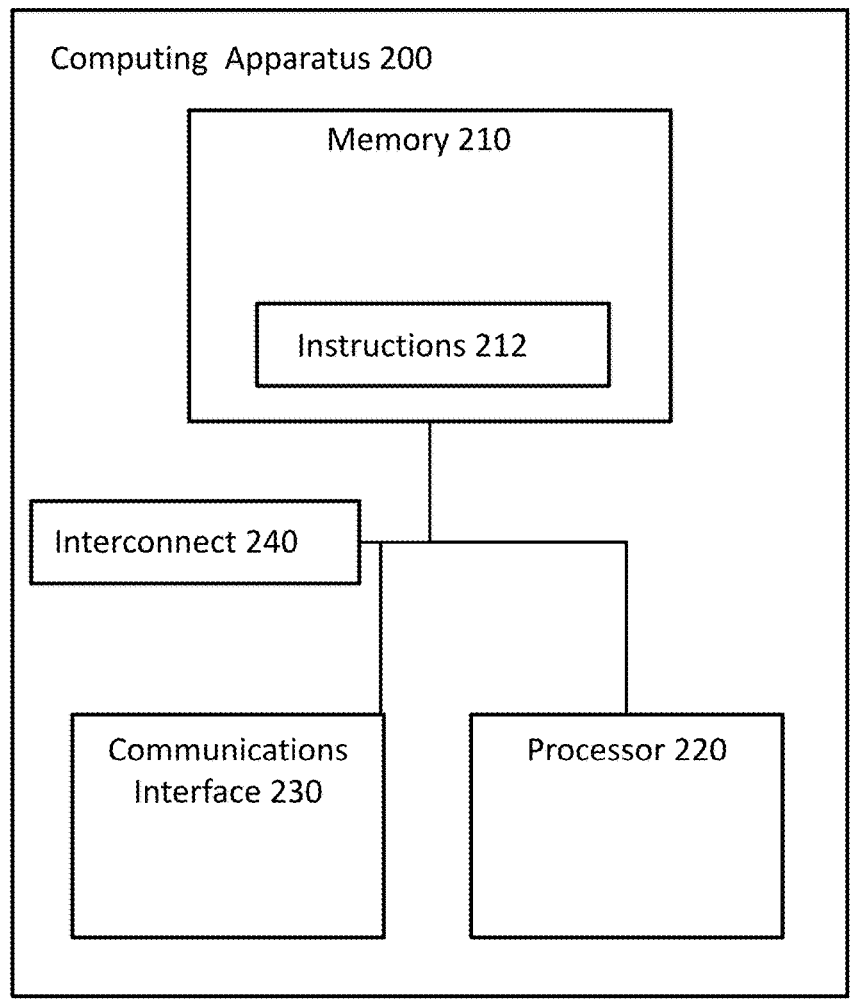
FIG. 12 is a block diagram of a computing apparatus or system in which various embodiments may be implemented or that may be utilized to execute various embodiments.

FIG. 12 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 12 is provided to generally illustrate how embodiments may be configured and implemented. The processors 126 in the server computing device 104 and the user computing device 106 are programmed with respective personalized financial podcast generation system 102, financial management system 110, web browser program 112 and podcast player program 114 so that they are no longer generic computing devices.

Having described various aspects of personalized financial podcast generation systems according to various embodiments, computer-implemented methods for analyzing user data and financial media content to generate personalized financial podcast using the personalized financial podcast generation systems will now be described. The methods also include identifying a keyword associated with a financial topic of interest to the user and calculating a weight for the keyword.

Figure 13:
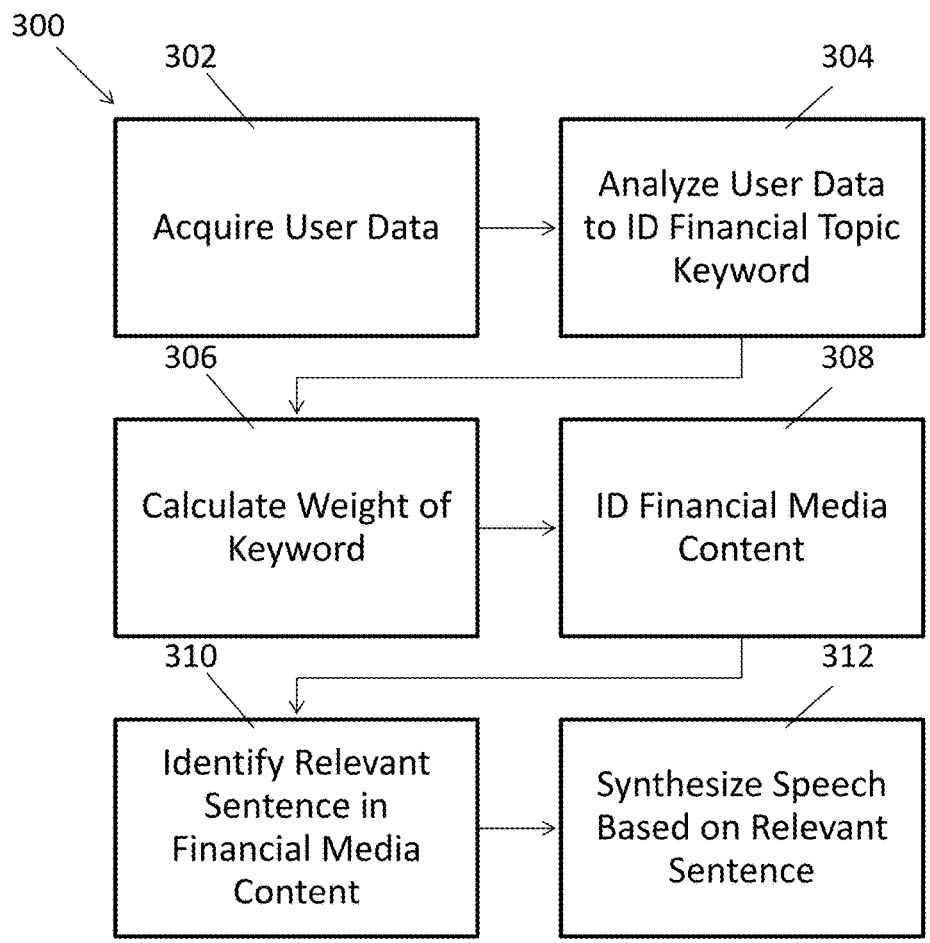
FIGS. 13 to 15 are flow charts depicting computer-implemented methods of generating personalized financial podcasts according to various embodiments.

FIG. 13 depicts a computer-implemented method 300 for analyzing user data and financial media content to generate personalized financial podcast according to one embodiment. The method 300 may be implemented using the personalized financial podcast generation systems (e.g., 102) running on the hardware systems (e.g., 100) depicted in FIGS. 1-11.

At step 302, the system 102 (e.g., the user data module 128) acquires user data indicative of a user's interest in a financial topic. User data include, but are not limited to, user profile data (e.g., bank, credit, investment, watch-list, etc.), user life events (e.g., buying property, getting married, having a child, etc.), user financial data (e.g., securities/stock ownership, etc.), and data available from an FMS 110. The user data may be obtained from the financial management system 110. The user data may be obtained from a server computing device 104 (as shown in FIG. 1), or by a server computing device 104 from a user data computing device 118 (as shown in FIG. 2). Alternatively, the user data may be obtained directly from a user (e.g., via the user computing device 106, 106'). In other embodiments, the user data may be obtained without user intervention.

At step 304, the system 102 (e.g., the user data module 128) analyzes the user data to identify a financial topic of interest to the user and a keyword associated therewith. For instance, if user data from the user's FMS account indicates that the user owns shares of BANK OF AMERICA stock, the user data module 128 may identify BANK OF AMERICA as a topic of interest to the user and identify the keywords "BANK OF AMERICA" and "BAC".

At step 306, the system 102 (e.g., the keyword analyzer 130) calculate respective weights for the keywords, where the weights are indicative of the user's level of interest in a financial topic associated with the keyword. The weight can be calculated based on the allocation of the user's resource (e.g., financial, time, browser, etc.) to the investment or topic associated with the keyword. For instance, if user data from an FMS indicates that the user has 75% of their assets invested in BANK OF AMERICA stock, the keyword "BANK OF AMERICA" will be assigned a higher weight than if the user has 25% of their assets invested in BANK OF AMERICA stock.

The weight can also be calculated based on a fluctuation of the user's resource allocation over time. For instance, if user data from an FMS indicates that the user has recently increased the percentage of their assets invested in BANK OF AMERICA stock, the keyword "BANK OF AMERICA" will be assigned a higher weight than if the user's resource allocation to BANK OF AMERICA stock over time has been consistent.

The weight can also be calculated based on the weight assigned to a keyword in a word cloud built from anonymized profile and keyword data of other users with similar profiles. Such embodiments may utilize data analytics or "big data" statistical techniques to build and analyze the word clouds, and to determine the correlation between previous users and the present user. Similar statistical correlative techniques are described in U.S. Application Ser. No. 15/008,025, filed Jan. 27, 2016, the contents of which are fully incorporated herein by reference as though set forth in full.

The keywords and weights in steps 304 and 306 can also be identified and calculated based on a category of securities owned by the user. For instance, the system 102 may identify "BIOTECH" as a keyword if user data from an FMS indicates that the user owns only stocks in the biotechnology sector. The keywords and weights in steps 304 and 306 can also be identified and calculated based on the presence of a security (e.g., FORD stock) in a watch list belonging to the user.

At step 308, the system 102 (e.g., the content analyzer) identifies financial media content of interest to the user based on the identified keywords and their associated weights. The financial media content may be obtained from news sources and aggregators, such as GOOGLE NEWS, YAHOO FINANCE, CNN MONEY, MORNING STAR, and ZACKS. The financial media content may be obtained from financial analysts. Each item of financial media content may be assigned a weight (e.g., using the word cloud method), and redundancies may be removed. The de-duplicated financial media content can then be filtered, sorted and prioritized based on the keywords and their associated weights to identify financial media content of interest to the user.

At step 310, the system 102 (e.g., the summarizer 134) identifies one or more relevant sentences in each item of financial media content identified as of interest to the user. The summarizer 134 may apply known semantic techniques to identify topic or conclusion sentences or paragraphs. The summarizer 134 may also add either extracted or generated headlines to the items of financial media content. The summarizer 134 can repeat this summarization process for a pre-determined number of items until the length of the summaries approximates a pre-determined podcast duration. The summarizer 134 may then assemble the items into a text document (e.g., one or more paragraphs), which could be transformed into a podcast, as shown in step 314 in FIG. 14.

The pre-determined number of items and pre-determined podcast duration may be obtained from the user during an initial setup of the system 102. After this brief setup, the system 102 can operate automatically without user intervention.

At step 312, the speech processor 136 synthesizes speech from the summaries formed from the relevant sentences or the text document assembled therefrom. In some embodiments, the speech processor 136 may add comprehension increasing features to the synthesized speech, and/or generate a personalized financial podcast from the synthesized speech. Comprehension increasing features include, but are not limited to, emphasis of certain words and/or sentence fragments, and audio signals (e.g., jingles) to compartmentalize the podcast by separating the summaries. An exemplary audio format is the MP3 format. Using the MP3 tag specification, all generated audio segments are tagged inside the MP3 to allow for quick and convenient navigation within the MP3 podcast.

Figure 15:
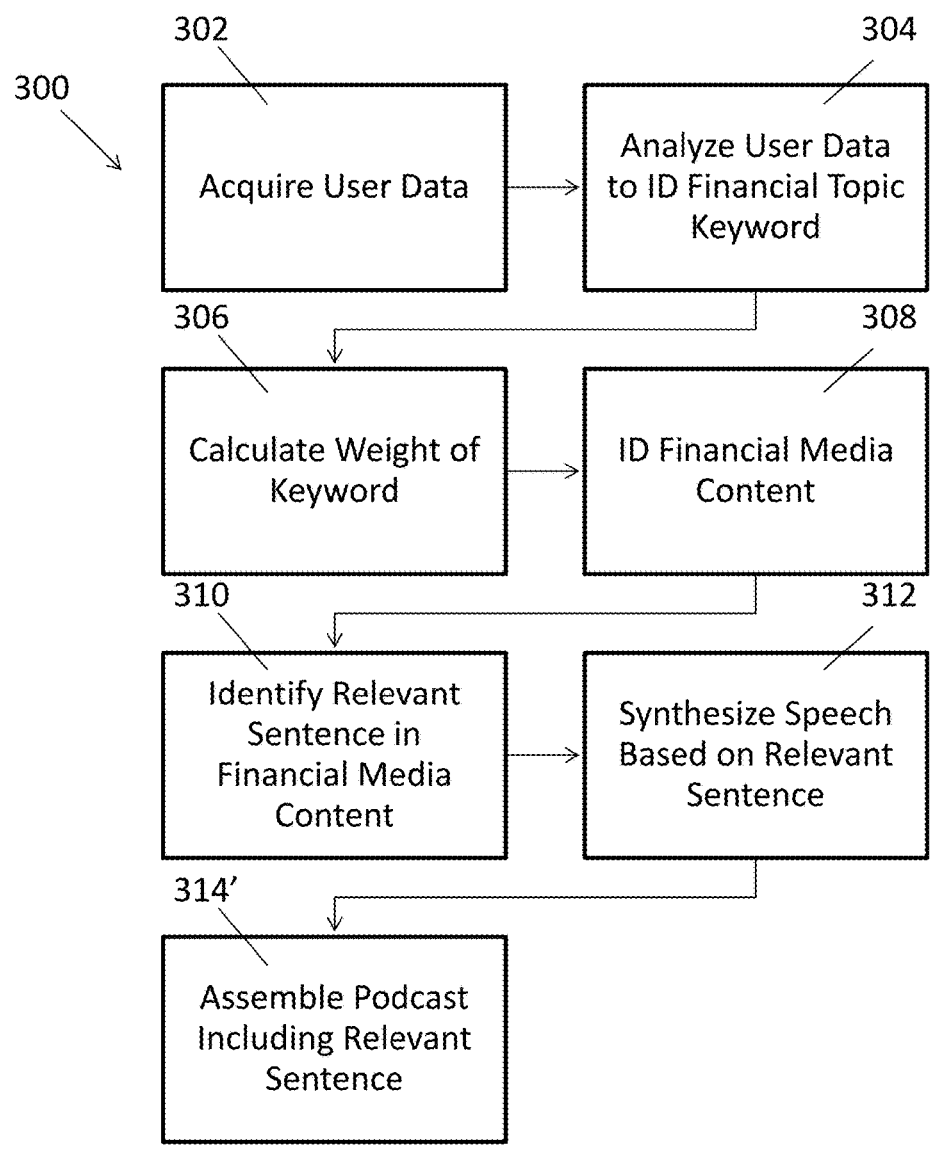

In another embodiment, as shown in step 314' in FIG. 15, each summary of an item of financial media content is first transformed into synthesized speech (with or without comprehension increasing features), and the generated audio segments are combined into a single audio file, i.e., the personalized financial podcast.

The personalized financial podcast may be distributed in push or pull fashion. After an MP3 file of the podcast has been generated, a push notification (including a URL to the MP3 file) may be sent to the user. In another embodiment, each user has a unique URL, which they can enter into their favorite podcast catcher, such as ITUNES, to fetch new releases of their podcast automatically and regularly.

Figure 14:
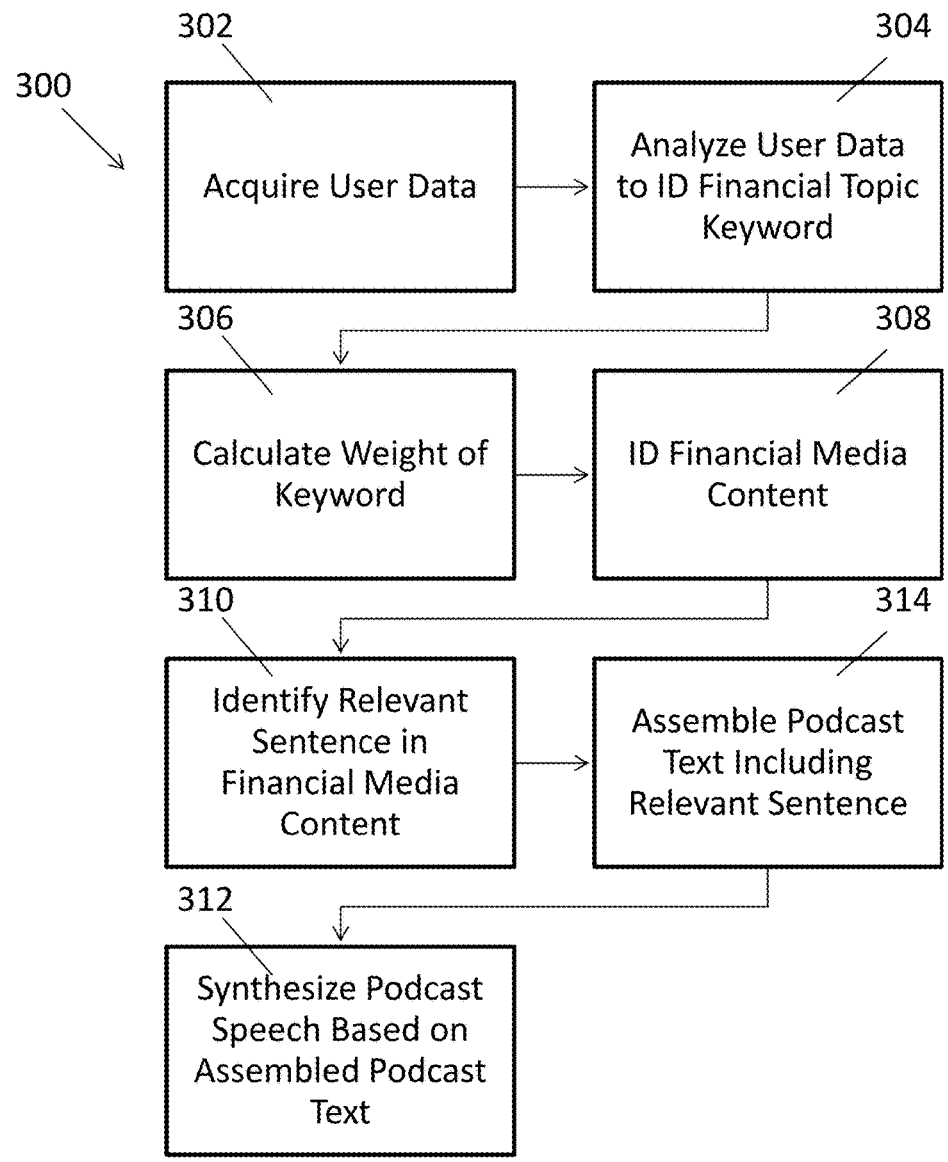

While FIGS. 13-15 illustrate embodiments of using a user data and financial media content to generate personalized financial podcasts, embodiments are not so limited. For example, the system 100 may process user data and other types of media content (e.g., sports, entertainment, etc.) to generate corresponding types of personalized podcasts.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

For example, while certain embodiments have been described with reference to simplified keyword identification and weighing examples, keyword identification and weighing can be substantially more complex such that predictive models, and combinations thereof, can be utilized across different types of user data. These predictive model capabilities are not available in known news aggregators.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computing system, comprising:
   a user data module comprising computer executable instructions stored in a memory of a computer and executable by a processor of the computer and being configured to acquire user data associated with a user from an account that the user has with a computerized financial management system and analyze the user data acquired from the account to identify a keyword associated with a financial topic of interest to the user automatically without user intervention;
   a keyword analyzer in communication with the user data module and comprising computer executable instructions executable by the processor and being configured to receive the keyword identified by the user data module and calculate a weight of the keyword automatically without user intervention, calculating the weight of the keyword comprising:
   examining allocation of at least one resource of the user;
   making a determination of at least one of a proportion of the allocation dedicated to a use associated with the keyword, a recent allocation dedicated to the use, and a category of the use, and
   assigning the weight corresponding to the determination, wherein the weight is indicative of the user's level of interest and a relevance in the financial topic associated with the keyword;
   a content analyzer in communication with the keyword analyzer and comprising computer executable instructions executable by the processor and being configured to receive the keyword and the weight from the keyword analyzer and identify financial media content based on the keyword and the weight automatically without user intervention, the financial media content comprising a plurality of sentences, identifying the financial media content comprising:
   receiving a plurality of financial media content items;
   assigning a weight to each of the financial media content items using a word cloud algorithm, wherein the word cloud algorithm uses anonymized profile and keyword data of other users with similar profiles to the user to determine a correlation between the other users and the user;
   de-duplicating the weighted financial media content items; and
   filtering, sorting, and prioritizing the de-duplicated weighted financial media content items based on the keywords and their associated weights and selecting at least one of the weighted financial media content items based on the weight of the selected at least one item and the weight of the keyword;
   a summarizer in communication with the content analyzer and comprising computer executable instructions executable by the processor and being configured to receive the financial media content, identify a relevant sentence of the plurality of sentences in the financial media content automatically without user intervention, and repeat the identifying for a pre-determined number of items until a pre-determined podcast length elapses;
   a speech processor in communication with the summarizer and comprising computer executable instructions executable by the processor and being configured to receive the relevant sentence and synthesize speech based on the relevant sentence automatically without user intervention;
   the summarizer being further configured to generate a digital audio file as a personalized podcast including the synthesized speech summarizing financial media content of interest to the user; and
   the computer being configured to assemble and distribute the digital audio file through a network to a computing device of the user.

2. The computing system of claim 1, wherein analyzing the user data comprises analyzing user profile data.

3. The computing system of claim 1, wherein analyzing the user data comprises analyzing an event associated with the user.

4. The computing system of claim 1, wherein analyzing the user data comprises analyzing user financial data.

5. The computing system of claim 1, wherein the weight of the keyword is further based on a fluctuation of allocation of user resources to the investment associated with the keyword over time.

6. The computing system of claim 1, wherein the weight of the keyword is further based on a weight of the keyword associated with another user having a profile similar to a profile of the user.

7. The computing system of claim 1, wherein identifying financial media content comprises filtering, sorting and prioritizing the financial media content.

8. The computing system of claim 1, wherein the financial media content comprises a body of text including the relevant sentence.

9. The computing system of claim 1, wherein identifying relevant sentence in the financial media content comprises analyzing an overall duration of the final podcast.

10. The computing system of claim 1, wherein identifying the relevant sentence in the financial media content comprises analyzing the weight of the keyword.

11. The computing system of claim 1, wherein identifying the relevant sentence in the financial media content comprises outputting a text paragraph.

12. The computing system of claim 1, wherein synthesizing speech based on the relevant sentence comprises emphasizing a portion of the relevant sentence.

13. The computing system of claim 12, wherein the portion of the relevant sentence is a word or a sentence fragment.

14. The computing system of claim 1, wherein synthesizing speech based on the relevant sentence comprises appending an audio signal to the relevant sentence.

15. The computing system of claim 1, wherein the content analyzer is configured to avoid identifying redundant financial media content.

16. The computing system of claim 1, wherein the user is an individual.

17. The computing system of claim 1, wherein the user is a business.

18. The computing system of claim 1, wherein the audio file is a MP3 file.

19. A computer-implemented method, comprising:
a computing device, by programmed instructions of a user data module stored in a memory of the computing device and executed by a processor of the computing device, acquiring user data associated with a user from an account that the user has with a computerized financial management system automatically without user intervention;
the computing device, by programmed instructions of the user data module, analyzing the user data acquired from the account to identify a keyword associated with a financial topic of interest to the user automatically without user intervention;
the computing device, by programmed instructions of a keyword analyzer in communication with the user data module, receiving the keyword identified by the user data module and calculating a weight of the keyword automatically without user intervention, calculating the weight of the keyword comprising:
examining allocation of at least one resource of the user,
making a determination of at least one of a proportion of the allocation dedicated to a use associated with the keyword, a recent allocation dedicated to the use, and a category of the use, and
assigning the weight corresponding to the determination, wherein the weight is indicative of the user's level of interest and a relevance in the financial topic associated with the keyword;
the computing device, by programmed instructions of a content analyzer in communication with the keyword analyzer, receiving the keyword and the weight from the keyword analyzer and identifying financial media content based on the keyword and the weight automatically without user intervention, the financial media content comprising a plurality of sentences, identifying the financial media content comprising:
receiving a plurality of financial media content items,
assigning a weight to each of the financial media content items using a word cloud algorithm, wherein the word cloud algorithm uses anonymized profile and keyword data of other users with similar profiles to the user to determine a correlation between the other users and the user,
de-duplicating the weighted financial media content items, and
filtering, sorting, and prioritizing the de-duplicated weighted financial media content items based on the keywords and their associated weights and selecting at least one of the weighted financial media content items based on the weight of the selected at least one item and the weight of the keyword;
the computing device, by programmed instructions of a summarizer in communication with the content analyzer, identifying a relevant sentence of the plurality of sentences in the financial media content automatically without user intervention and repeating the identifying for a pre-determined number of items until a pre-determined podcast length elapses;
the computing device, by programmed instructions of a speech processor in communication with the summarizer, receiving the relevant sentence and synthesizing speech based on the relevant sentence automatically without user intervention such that the synthesized speech is included in an audio file summarizing financial media content of interest to the user;
the computing device, by programmed instructions of the summarizer, generating a digital audio file as a personalized podcast automatically without user intervention, the digital audio file including the synthesized speech summarizing financial media content of interest to the user; and
the computing device assembling and distributing the digital audio file through a network to a computing device of the user.

20. The method of claim 18, wherein analyzing the user data comprises analyzing user profile data.

21. The method of claim 19, wherein analyzing the user data comprises analyzing an event associated with the user.

22. The method of claim 19, wherein analyzing the user data comprises analyzing user financial data.

23. The method of claim 19, wherein the weight of the keyword is further based on a fluctuation of allocation of user resources to the investment associated with the keyword over time.

24. The method of claim 19, wherein the weight of the keyword is further based on a weight of the keyword associated with another user having a profile similar to a profile of the user.

25. The method of claim 19, wherein identifying financial media content comprises filtering, sorting and prioritizing the financial media content.

26. The method of claim 19, wherein the financial media content comprises a body of text including the relevant sentence.

27. The method of claim 19, wherein identifying relevant sentence in the financial media content comprises analyzing an overall duration of the final podcast.

28. The method of claim 19, wherein identifying the relevant sentence in the financial media content comprises analyzing the weight of the keyword.

29. The method of claim 19, wherein identifying the relevant sentence in the financial media content comprises outputting a text paragraph.

30. The method of claim 19, wherein synthesizing speech based on the relevant sentence comprises emphasizing a portion of the relevant sentence.

31. The method of claim 30, wherein the portion of the relevant sentence is a word or a sentence fragment.

32. The method of claim 19, wherein synthesizing speech based on the relevant sentence comprises appending an audio signal to the relevant sentence.

33. The method of claim 19, further comprising avoiding identifying redundant financial media content.

34. The method of claim 19, wherein the user is an individual.

35. The method of claim 19, wherein the user is a business.

36. The method of claim 19, wherein the audio file is a MP3 file.

* * * * *